(12) United States Patent
Genoud et al.

(10) Patent No.: US 7,975,526 B2
(45) Date of Patent: *Jul. 12, 2011

(54) CALIBRATION WEIGHT ARRANGEMENT FOR AN ELECTRONIC BALANCE

(75) Inventors: Dominique Genoud, Olten (CH); Peter Schilling, Siebnen (CH); Thomas Koeppel, Oetwill am See (CH); Matthias Scheu, Uster (CH)

(73) Assignee: Mettler-Toledo AG, Greifensee (CH)

( * ) Notice: Subject to any disclaimer, the term of this patent is extended or adjusted under 35 U.S.C. 154(b) by 0 days.

This patent is subject to a terminal disclaimer.

(21) Appl. No.: 12/885,985

(22) Filed: Sep. 20, 2010

(65) Prior Publication Data

US 2011/0005295 A1  Jan. 13, 2011

Related U.S. Application Data

(60) Division of application No. 12/343,158, filed on Dec. 23, 2008, which is a continuation of application No. PCT/EP2007/056414, filed on Jun. 27, 2007.

(30) Foreign Application Priority Data

Jun. 28, 2006 (EP) .................................. 06116246

(51) Int. Cl.
*G01G 23/01* (2006.01)
(52) U.S. Cl. ......................................... 73/1.13
(58) Field of Classification Search .................. 73/1.13; 177/50, 245
See application file for complete search history.

(56) References Cited

U.S. PATENT DOCUMENTS

| 2,185,045 | A | * | 12/1939 | Unruh et al. | 177/154 |
| 3,738,439 | A | * | 6/1973 | Hebert | 177/50 |
| 3,924,443 | A | * | 12/1975 | Hebert | 73/1.13 |
| 4,156,361 | A | * | 5/1979 | Melcher et al. | 73/1.13 |
| 5,148,881 | A | | 9/1992 | Leisinger | |
| 5,866,854 | A | | 2/1999 | Emery et al. | |
| 6,194,672 | B1 | | 2/2001 | Burkhard et al. | |
| 7,395,689 | B2 | * | 7/2008 | Genoud et al. | 73/1.13 |
| 7,429,705 | B2 | | 9/2008 | Genoud et al. | |
| 7,596,984 | B2 | | 10/2009 | Genoud et al. | |
| 7,631,536 | B2 | | 12/2009 | Genoud et al. | |

FOREIGN PATENT DOCUMENTS

| DE | 19920436 A1 | 11/2000 | |
| DE | 20119525 U1 | 4/2003 | |
| DE | 20318788 U1 | 5/2004 | |
| FR | 2657961 A1 * | 8/1991 | 177/225 |
| JP | 11064146 A * | 3/1999 | |
| WO | 01/71899 A2 | 9/2001 | |

* cited by examiner

*Primary Examiner* — Thomas Noland
(74) *Attorney, Agent, or Firm* — Standley Law Group LLP

(57) ABSTRACT

A calibration weight arrangement (4, 104) for an electronic balance with a force-transmitting mechanism (1) has a calibration weight (3, 103) adapted to be coupled to the force-transmitting mechanism. The arrangement also has a transfer mechanism and a drive source to manipulate the calibration weight in a guided movement. The drive source includes an actuator (18) cooperating with the transfer mechanism and at least one piezoelectric element (19) which drives the movement of the actuator. The piezoelectric element interacts with a drive wheel (17, 117) that is centrally positioned relative to the calibration weight arrangement and drives a likewise centrally positioned shaft (16, 126). The interaction between the piezoelectric element and the drive wheel occurs during the advance movement in one direction through the repeated engagement and release of a frictional contact force.

20 Claims, 4 Drawing Sheets

CALIBRATION WEIGHT ARRANGEMENT FOR AN ELECTRONIC BALANCE

CROSS-REFERENCE TO RELATED APPLICATIONS

This application is a divisional of U.S. Pat. No. 12/343,158, filed 23 Dec. 2008 and currently pending, which is a continuation under 35 USC §120 of PCT/EP2007/056414, filed 27 Jun. 2007, which is in turn entitled to benefit of a right of priority under 35 USC §119 from European patent application 06 11 6246.7, filed 28 Jun. 2006. The content of each of the above-cited applications is incorporated by reference as if fully recited herein.

TECHNICAL FIELD

The invention relates to a calibration weight arrangement for an electronic balance and in particular to a drive mechanism for a calibration weight arrangement.

BACKGROUND OF THE ART

Electronic balances are in many cases calibrated by means of an internal calibration weight. To perform a calibration, a calibration weight of a defined mass is brought into force-transmitting contact with the force-transmitting mechanism that is arranged in the force-measuring cell of a balance, whereupon a reference weight is determined. Based on this reference value, it is possible to adjust further weighing parameters of the balance. After the calibration has been successfully completed, the contact between the calibration weight and the force-transmitting mechanism is released again and the calibration weight is locked in a rest position. In this process, the calibration weight is moved from a rest position into a calibrating position and back by a transfer mechanism which includes at least one lifting element cooperating with a drive mechanism. In the calibrating position, the calibration weight is in force-transmitting contact with the force-transmitting device, while there is no force-transmitting contact in the rest position.

The known state of the art offers various types of lifting elements and versions of calibration weight arrangements.

A calibration weight which is disclosed in EP 0 468 159 B1 is moved vertically by pairs of wedge blocks sliding horizontally against each other and is thereby brought into force-transmitting contact with the force-transmitting device of the balance. This lifting element is driven by way of a motor and a horizontally oriented spindle which is connected to the wedge blocks.

A device described in EP 0 955 530 A1 likewise effects a vertical lifting and lowering of a calibration weight. The weight rests on a seat which is moved by an electrically driven lifting element.

An arrangement is described in DE 203 18 788 U1, where a monolithically formed calibration weight is lifted and lowered by a ramp-like lifting element, wherein the lifting element is actuated by a linear drive and performs a kind of slanted translatory movement.

In many balances, the calibration weight arrangement and the force-transmitting device are arranged behind one another, as is disclosed in EP 0 955 530 A1. However, the calibration weight can also be split up for example into two calibration weights and can be attached laterally to the force-transmitting device, like the cylindrical calibration weights disclosed in EP 0 789 232 B1. The two identical weights are arranged on two opposite sides of the force-transmitting device. Two different mechanisms for moving the calibration weights are described. In the first case, the calibration weight which is equipped with a guide pin is resting on a calibration weight seat configured as a support. To perform a calibration, the calibration weight seat which is hinged on one side is tilted, whereby the calibration weight is lowered and set onto two calibration weight carriers that are connected to the force-transmitting device and are configured as rods or levers. In a second version, the weight in its rest position is held on a calibration weight seat that is arranged between the calibration weight carriers that are connected to the force-transmitting device. To perform a calibration, the calibration weight is brought into contact with the calibration weight carriers through a vertical downward movement of the calibration weight seat.

A calibration weight arrangement is disclosed in DE 201 19 525 U1 with a lifting device for a calibration mechanism which includes two angled levers with fulcrum mounts fixed in the housing, whose vertical lever arms are coupled to each other by a horizontal slide and on whose horizontal lever arms the calibration weight is seated.

The aforementioned lifting elements are generally driven by servo motors. The disadvantage in using a servo motor is that it uses a comparatively large amount of space in the force-measuring cell of the balance, whereby the force-measuring cell as well as the balance itself is unnecessarily enlarged.

Especially in highly sensitive electronic balances, the weighing result is influenced and even changed by electrostatic charges and interactions. The servo motors which are used to drive the transfer mechanisms contain electrically non-conductive gearbox components which generate electrostatic charges through friction which occurs during operation. The resulting electrostatic fields, but also electromagnetic fields of conventional electric motors, are strong enough to influence the weighing result, in particular in balances of high sensitivity.

Almost always, the calibration weight arrangements of the known state of the art have relatively large drive mechanisms. To make an improvement in the calibration weight arrangement therefore requires in particular an optimization and miniaturization of the drive source of the transfer mechanism. The drive source needs to be very small, compact and flexible to meet different application requirements.

SUMMARY

This task is solved by a calibration weight arrangement and by an electronic balance according to the independent claims. The calibration weight arrangement for an electronic balance with a force-transmitting mechanism comprises at least one calibration weight that can be coupled to the force-transmitting mechanism of the balance, and it also comprises a drive source and a transfer mechanism for the guided movement of the calibration weight. The drive source includes an actuator working together with the transfer mechanism and at least one piezoelectric element driving the actuator. The piezoelectric element interacts with a drive wheel which is arranged in the center of the calibration weight arrangement and drives a likewise centrally located shaft, wherein the interaction occurs during the advance in one direction through the repeated engagement and release of a frictional contact force.

An actuator, as the term is used in the present context, encompasses the elements of the drive mechanism which perform a movement, wherein a kinematic behavior of the desired kind and direction often occurs as a result of at least two elements working together.

A calibration weight arrangement which is equipped with a drive mechanism that includes a piezoelectric element has the advantage that only a small amount of space is required to add the drive mechanism to the calibration weight arrangement. The drive mechanism is small and compact and can therefore be placed at any desired location. As a further advantage, the accumulation of electrostatic charges in the drive mechanism or its components is avoided. The drive mechanism further has no magnetic or magnetizable components which could interfere with the operation of a force-measuring cell of a balance that operates according to the principle of electromagnetic force compensation.

The transfer mechanism of the calibration weight arrangement includes a lifting element, a seat for the calibration weight, and a guiding device. The lifting element includes the shaft which produces the advancing movement and a lifting- or guide platform. The latter can be integrally connected with the seat for the calibration weight. One advantage of this arrangement is that due to its rigid connection with the shaft, the seat for the calibration weight cannot tip over. This trait is further enhanced by the guiding device. However, the main function of the guiding device is to prevent a rotation of the lifting- or guide platform during the advance movement.

The effect of this is a guided movement, in particular a vertical movement, of the calibration weight seat and thus also of the calibration weight itself, so that when a calibration is taking place, the calibration weight can be brought into force-transmitting contact with the force-transmitting device of the force-measuring cell of a balance. After the calibration has been successfully completed, this force-transmitting contact has to be released again and the transfer mechanism needs to be returned to its rest position. This task is solved through the especially advantageous way in which the drive mechanism works, as the direction of movement is reversible with this kind of drive mechanism, which means that the upward and downward movements are accomplished with the same elements.

This drive mechanism has the further advantage that it is easy to realize a desired velocity profile in controlling the movement of a calibration weight that is to be brought into or returned from its calibrating position by means of the transfer mechanism. It is advantageous if the handing-over of a calibration weight, i.e. that phase where it comes into force-transmitting contact with the force-transmitting device, is performed with the slowest possible speed in order to avoid shocks as much as possible and further to allow the calibration weight to seat itself precisely on the calibration weight carrier that is connected to the force-transmitting mechanism.

As a further distinctive trait, due to the self-locking nature of the drive mechanism, the calibration weight seat which is in most cases movable in the vertical direction is immobilized when there is no current flowing in the drive mechanism.

In a further possible configuration of the calibration weight arrangement, the drive mechanism is equipped with a rotary piezoelectric motor, in particular a traveling wave motor or a motor with a ring-shaped piezo element, which has a shaft on which the lifting element performs a vertical movement by means of a spindle that is an integral part of the shaft.

In a further development of the subject of the invention, the drive mechanism can be equipped to perform a sensor function to monitor the proper functioning of the transfer mechanism. The monitoring of the current for activating the piezoelectric element or of the inductively of the feedback loop can be used for example to determine the position of the lifting element and the calibration weight.

In a preferred embodiment, the piezoelectric element of the drive mechanism of the calibration weight arrangement has a pusher finger that moves along an elliptical path, wherein the finger in the course of this movement can periodically come into contact, i.e. enter into a frictional or form-fitting engagement, with a drive wheel. A piezoelectric drive of this kind is disclosed for example in WO 01/71899. The pusher finger sets the drive wheel as well as a shaft with an external thread into rotation, while a guide platform with an internal thread is arranged to move along the shaft.

Due to the undesirable heat generation of the drive, the latter is arranged in a recess in the base plate on which the force-transmitting device is mounted. The base plate can have a reduced thickness in the area of the recess where an opening can be arranged for the passage of at least a part of the lifting element, for example for a shaft which can be constrained by a bearing in the opening. Thus, the excess heat is carried away through the base plate and possibly through the housing.

BRIEF DESCRIPTION OF THE DRAWINGS

The layout of a calibration arrangement in relation to a force-transmitting device of an electronic balance as well as a preferred embodiment of the calibration weight arrangement are shown in the drawings which are described in the following and wherein.

DETAILED DESCRIPTION OF THE DRAWINGS

Figure 1:
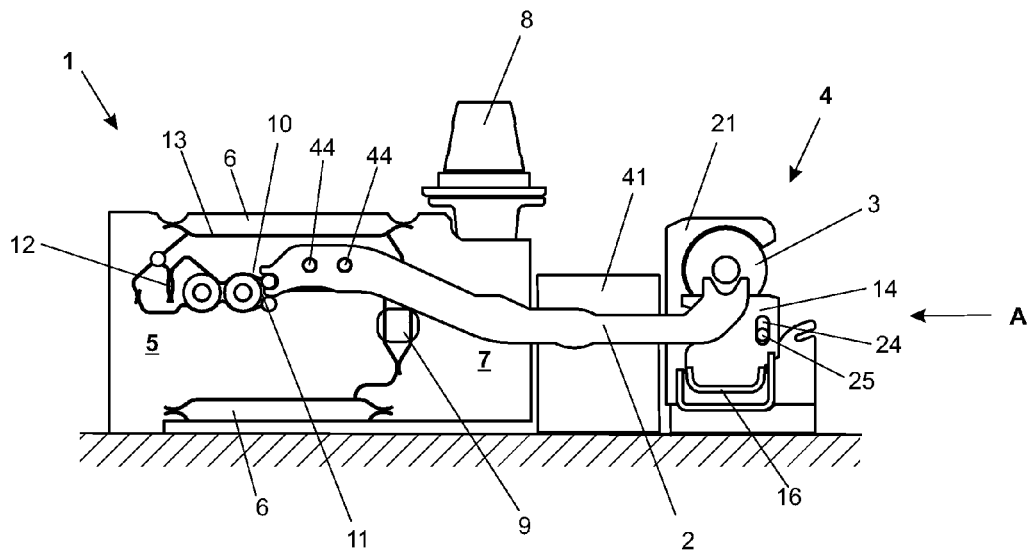
FIG. 1 represents a schematic side view of a force-transmitting device of an electronic balance with elongated calibration weight carriers and a calibration weight arrangement disposed in the lengthwise extension of the force-transmitting device, with a calibration weight in its rest position.
Figure 2:
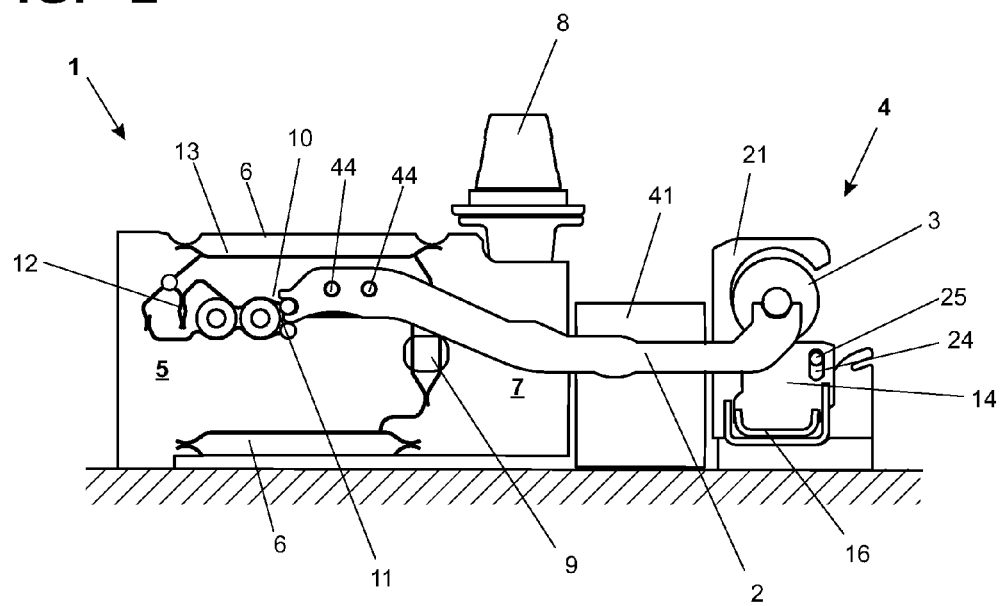
FIG. 2 represents a schematic side view of the force-transmitting device and the calibration weight arrangement of FIG. 1 during the calibration process.

FIGS. 1 and 2 show a calibration weight arrangement 4 as seen from the side and its position relative to a force-transmitting device 1 of a force-measuring cell of, e.g., an electronic balance. The calibration weight arrangement 4 is shown in its rest position in FIG. 1, while FIG. 2 illustrates the situation during a calibration process. The force-transmitting device 1 includes a parallel-guiding mechanism with a stationary parallelogram leg 5 and, tied to the latter by two parallelogram guides 6, a movable parallelogram leg 7. The movable parallelogram leg is connected through a truncated cone 8 to a weighing pan (not shown in this drawing). By placing a load on the pan, the movable parallelogram leg 7 can be displaced relative to the stationary parallelogram leg 5 in the direction of gravity. The force-transmitting device 1 includes a first coupling element 9 which transmits a force introduced into the movable parallelogram leg 7 to a lever mechanism. The lever mechanism in the illustrated force-transmitting device 1 has a first force-reduction lever 10 which is connected to a second lever 11 through a second coupling element 12. The first and second coupling elements 9, 12 act through thinned-down flexible pivoting sections on the first and second levers 10, 11, respectively.

A displacement of the movable parallelogram leg 7 in the direction of gravity causes a force to be transmitted to the lever mechanism which transmits the force, reduced by the lever ratio, to an electromagnetic force-compensation system 41 which is not shown in detail here.

The parallel-guiding mechanism 5, 6, 7, the first and second coupling elements 9, 12, and the first and second levers 10, 11 are formed in the substantially brick-shaped material block in such a way that its material domains are separated from each other by material-free gaps in the form of thin linear cuts 13 which traverse the material block in the direction perpendicular to its largest aspect area. The linear cuts 13 are produced preferably by means of spark erosion. Obviously, the material-free gaps could also be produced in a grinding process.

The lever 10 is provided with through holes where two calibration weight carriers 2 are attached by means of suitable fasters 44 as extensions of the shorter lever arm at the input side of the first lever 10. The second of the calibration weight carriers 2 is arranged on the opposite side of the force-transmitting mechanism 1, parallel to the first carrier, and is hidden in this drawing.

As can be seen in FIG. 1, as long as the balance is in weighing mode, the calibration weight 3 rests on a calibration weight seat 14 and is pushed against the lateral parts 21 of the calibration weight arrangement which are configured as parking brackets. For better visibility, the front-facing lateral part has been omitted in this view as well as in FIG. 2. The calibration weight 3, when in its rest position, is completely uncoupled from the lever mechanism of the force-transmitting device.

To perform a calibration, the calibration weight is lowered onto the two calibration weight carriers 2 by means of a transfer mechanism and is thereby brought into force-transmitting contact with the lever mechanism, as is shown in FIG. 2. The calibration weight 3 in this representation rests completely on the calibration weight carrier 2 and is free from contact with the calibration weight seat 14. The transfer mechanism in this view is covered up by the calibration weight seat 14 and is therefore invisible in FIGS. 1 and 2. The transfer mechanism includes a lifting element, of which only the lifting platform 16 is visible in this representation, and a drive mechanism which is likewise not visible here (see FIGS. 3 and 4).

The two lateral parts 21 of the calibration weight arrangement which are configured as parking brackets immobilize the calibration weight 3 in its rest position (see FIG. 1). To receive the calibration weight 3, the lateral parts 21 have indentations of approximately circular shape. In its rest position, the calibration weight 3 rests on the calibration weight seat 14. The drive mechanism is self-locking, which means that it will remain in the position in which it was when the power was turned off, which is adjusted so that the calibration weight 3 is pushed with a slight force against the parking bracket 21, whereby the calibration weight is protected against becoming dislodged by a fall or shock.

The calibration weight seat 14 in the illustrated embodiment is solidly connected to the lifting platform 16 and is guided in vertical movement by two guide rods 25 which are fastened to the lateral parts 21 and pass through two elongated holes 24 in the calibration weight seat 14. The elongated holes 24 determine the limits of the vertical displacement path of the calibration weight seat 14 and serve in addition as a safeguard to keep the calibration weight seat from possibly tipping over.

Figure 3:
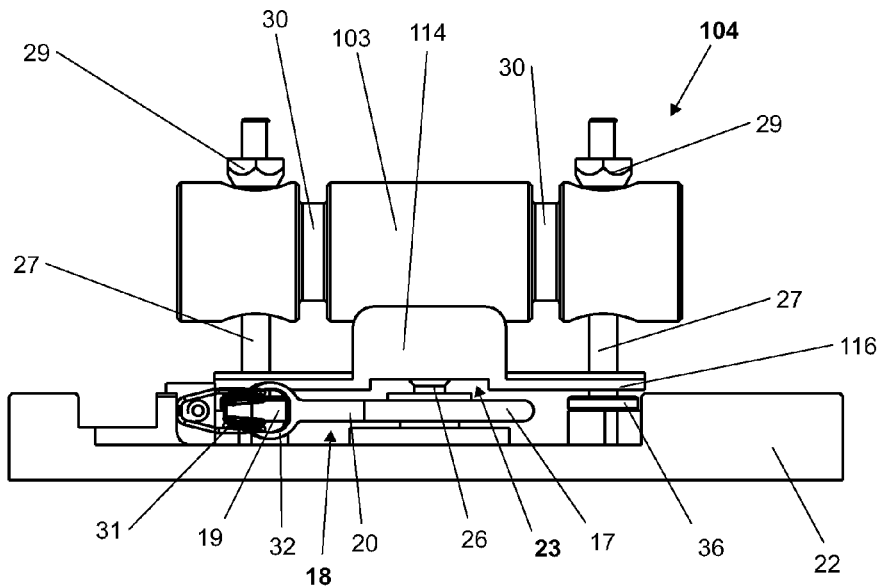
FIG. 3 represents a side view of a calibration weight arrangement with a transfer mechanism that differs from the one illustrated in FIGS. 1 and 2.

FIG. 3 shows a further embodiment of the calibration weight arrangement 104 in a side view from the direction indicated by the arrow A in FIG. 1. Elements that are the same as those in FIGS. 1 and 2 are identified by the same reference numerals and are not explained again here.

The calibration weight arrangement 104 includes a transfer mechanism with a lifting element 23 which works together with an actuator 18 of the drive mechanism. The drive mechanism includes a piezoelectric element 19 which moves a pusher finger 20 on an elliptical path. In the course of this movement, the pusher finger 20 periodically comes into contact, i.e. enters into a frictional engagement, with a drive wheel 17 arranged in the center of the calibration weight arrangement 104, whereby the drive wheel is set into rotation. A likewise centrally aligned shaft 26 is solidly connected to the drive wheel 17. The shaft 26 has an external screw thread which engages an internally threaded hole in a guide platform 116, so that the guide platform can be moved vertically up and down along the shaft 26. The calibration weight seat 114 is located above the guide platform 116. In the illustrated embodiment, the calibration weight seat is formed of one piece together with the guide platform 116. This makes it impossible for the guide platform for example to tip over with a calibration weight 103 placed on the calibration weight seat 114. By means of a guiding device, the guide platform 116 is constrained, so that it has no degree of freedom in a plane perpendicular to the direction of movement. The guiding device has two guide posts 27 which are solidly connected with the base 22 of the transfer mechanism and pass through the calibration weight 103 as well as through the guide platform 116. The passages through the calibration weight 103 have contact-free clearance from the guide posts. To raise the guide platform 116 with the calibration weight seat 114, i.e. when the calibration weight 103 is to be lifted off the calibration weight carrier (not visible here), the guide platform 116 with the calibration weight 103 resting on the calibration weight seat 114 glides upwards along the guide posts 27 until the calibration weight 103 arrives at the stops 29 which delimit the range of travel in the upward direction. When the guide platform 116 with the calibration weight seat 114 is lowered, i.e. to set the calibration weight 103 on the calibration weight carrier (not visible here) in order to perform a calibration measurement, the guide platform 116 with the calibration weight 103 resting on the calibration weight seat 114 glides downwards along the guide posts 27 until the travel-delimiting disks 36, one of which is connected to each guide post 27, are brought into contact with parts of the base 22. In this situation, the calibration weight is no longer resting on the calibration weight seat 114 but on the calibration weight carrier. The calibration weight 103 is essentially cylinder-shaped and has two circumferential grooves 30 for the engagement of the calibration weight carrier (not shown here).

Figure 4:
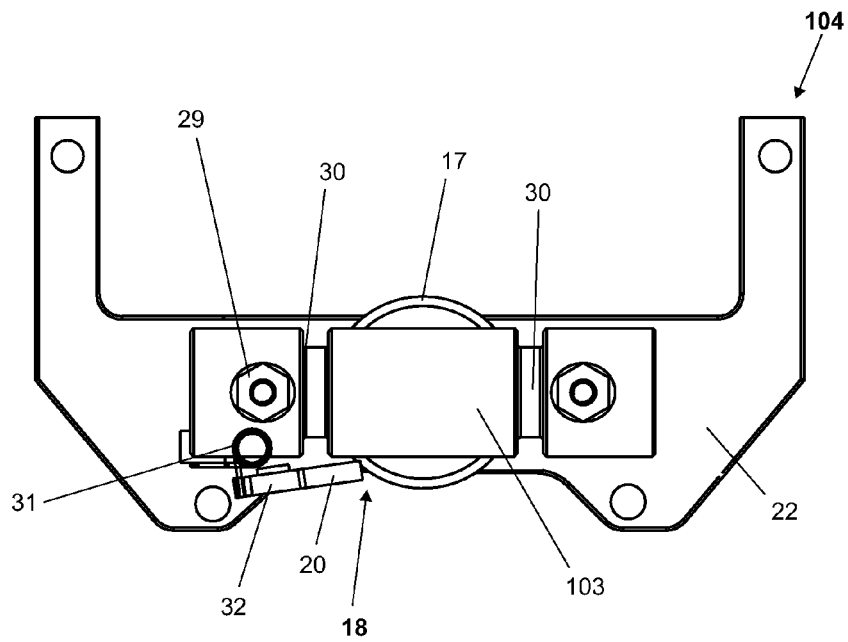
FIG. 4 represents a top view of the calibration weight arrangement of FIG. 3.

In a top view of the calibration weight arrangement 104, FIG. 4 illustrates how the drive wheel 17 and the pusher finger 18 work together. The latter is made preferably of aluminum and is integrally connected to a ring 32 (see FIG. 3) in which the piezoelectric element 19 of the drive mechanism is held with a press fit. A spring 31 urges the pusher finger 18 against the drive wheel 17, so that the force which acts on the drive wheel 17 during the periodically occurring friction contact is large enough to set the drive wheel into rotation. Outside of the time periods of friction contact, the force of the piezoelectric element 19 is able to overcome the force of the spring 31, so that the pusher finger 18 will separate itself from the drive wheel 17 for short time intervals. A piezoelectric drive arrangement of this kind and its operation are described in WO 01/71899.

Figure 5:
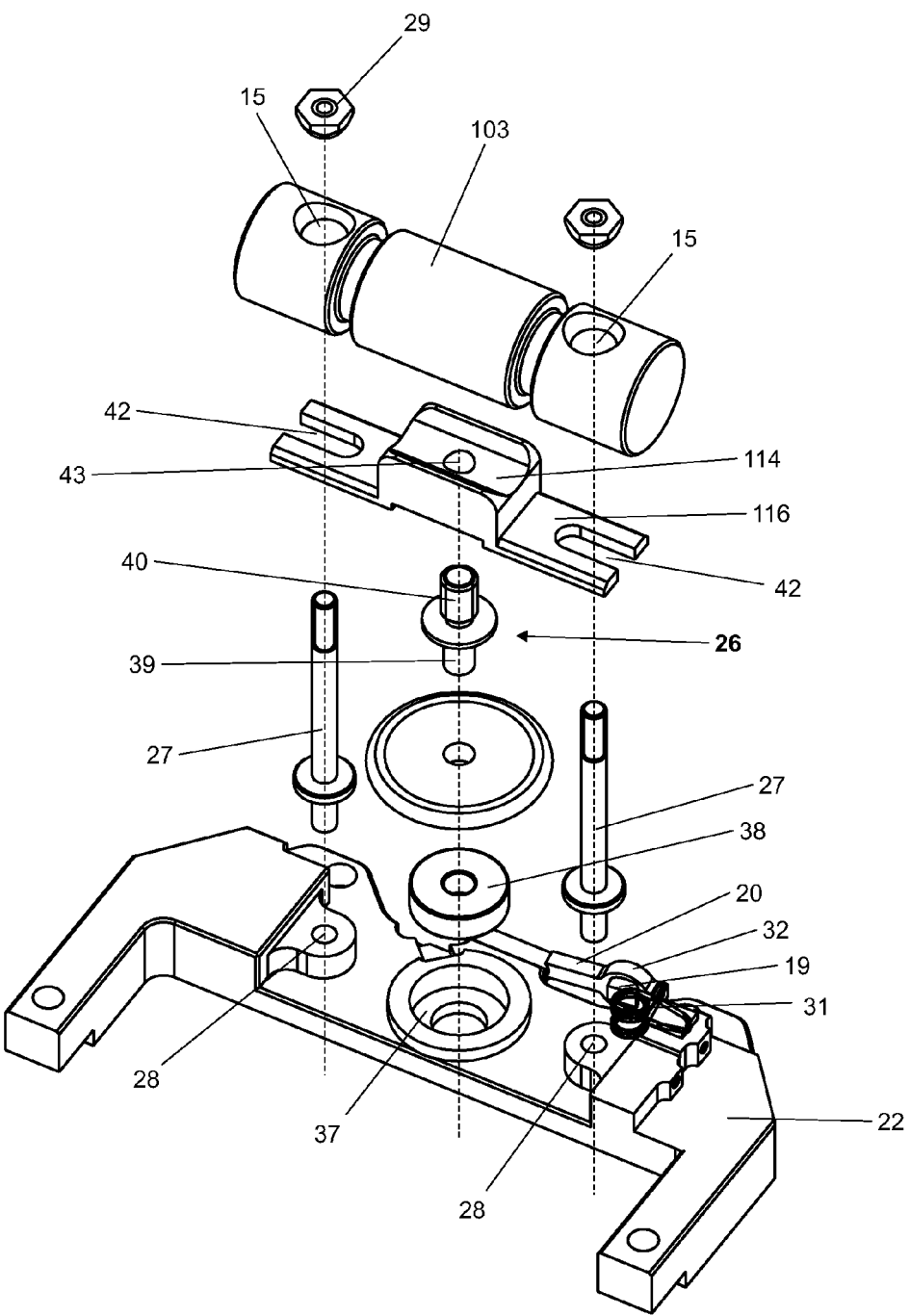
FIG. 5 is an exploded perspective view of the FIG. 3 embodiment.

FIG. 5 illustrates the calibration weight arrangement 104 of FIGS. 3 and 4 in perspective in an exploded view. The base 22 has at its center a round recess 37 into which a bearing 38 is fitted. The shaft 26 is rotatably constrained in the bearing 38. A downward-directed pin 39 of the shaft 26 is press-fitted into the central opening of the drive wheel 17, so that the shaft and the drive wheel are firmly connected to each other. An upper section 40 of the shaft 26 carries an external thread which is engaged in the internal thread of the hole 43 of the calibration weight seat 114 which is designed as an integral unit with the guide platform 116. The guide platform 116 is equipped with a guide brace 42 on each side which is dimensioned so that the guide platform 116 can glide along the guide posts 27 with almost no free play. The calibration weight 103 has two holes through which the guide posts 27 pass in their installed condition, with the upper ends of the posts 27 being blocked by the bolts 29 acting as an upper limit stop. Each of the guide posts 27 is press-fitted into a bore hole 43 in the base 22. Also shown in FIG. 5 are the pusher finger 20 as well as the spring 31 and the ring 32 in which the piezoelectric element 19 is seated which moves the pusher finger 20 on its path.

The holes 15 of the calibration weight 103 have a diameter that is larger than the width of the recesses 42 of the guide platform 116, so that the guide posts 27 will not touch the calibration weight 103.

Figure 6:
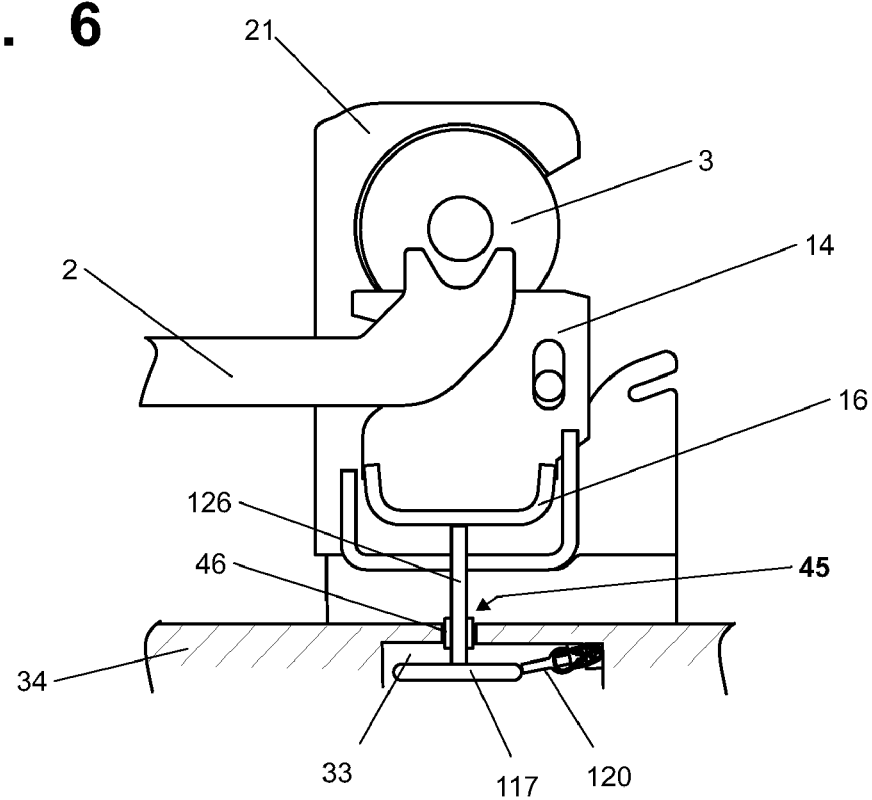
FIG. 6 is an enlarged detail view of the FIG. 1 embodiment, with the drive mechanism arranged in a recess of the base plate.

Since a drive mechanism with a piezoelectric element generates heat during operation, which is undesirable in the space occupied by the force-measuring cell of a balance, the drive mechanism in an embodiment of the force-measuring cell as shown schematically in FIG. 6 as an enlarged detail of FIG. 1 is installed in a recess 33 of the base plate 34 on which the force-transmitting mechanism is arranged. The part of the base plate 34 which remains between the drive wheel 117 of the actuator and the guide platform 16 has an opening 45 through which the shaft 126 passes. The opening 45 contains a bearing 46 which constrains the shaft 126. Thus, the excess heat is carried off through the base plate 34 and, if applicable, through a housing that is connected to the base plate. This arrangement has the further advantage that abraded matter which may possibly be produced by the friction between the pusher finger 120 and the drive wheel 117 originates outside of the space containing the force-measuring cell and therefore does not contribute to the contamination of the latter. According to a further variation, the drive mechanism is accommodated in a recess of the base plate which is open from above, similar to what is shown in FIGS. 3 to 5.

The drive mechanism can in particular be equipped to perform a sensor function to monitor the proper functioning of the transfer mechanism. The monitoring of the current for activating the piezoelectric element or of the inductively of the feedback loop can be used for example to determine the position of the lifting element and the calibration weight.

The preferred embodiments presented here illustrate the combination of a calibration weight arrangement with a monolithically constructed force-transmitting mechanism which is suitable to work with force-measuring device according to the principle of electromagnetic force compensation. There are other state-of-the-art force-transmitting devices which can be combined with a calibration weight arrangement of the kind illustrated herein. As an example, one could mention an elastically deformable body of the kind used in strain gauge load cells, or a conventional force-transmitting device consisting of a plurality of components that are connected to each other. Any force-transmitting device of this kind could of course be combined likewise with a calibration weight arrangement that has a drive mechanism with a piezoelectric element as described in the examples for carrying out the invention.

Calibration arrangements of the kind presented herein can be used in balances of high resolution as well as in balances with a lower level of resolution.

What is claimed is:

1. A calibration weight arrangement for an electronic balance comprising a force-transmitting mechanism, the calibration weight arrangement comprising:
   a calibration weight adapted to be coupled to the force-transmitting mechanism;
   a transfer mechanism to manipulate the calibration weight in a guided movement, comprising a lifting- or guide platform having an internal screw thread; and
   a drive mechanism, comprising an actuator that cooperates with the transfer mechanism, the actuator comprising a shaft equipped with an external screw thread on which the internal screw thread of the transfer mechanism is arranged, such that rotation of the shaft effects linear displacement of the lifting- or guide platform along the shaft.

2. The arrangement of claim 1, wherein:
   the transfer mechanism further comprises:
   a lifting element;
   a calibration weight seat; and
   a guiding device.

3. The arrangement of claim 2, wherein:
   the guiding device comprises:
   two guide posts arranged laterally of the shaft; and
   a guiding brace formed on each side of lifting- or guide platform, sized so that the guide platform can glide along the guide posts almost free of loose play.

4. The arrangement of claim 3, further comprising:
   a calibration weight seat that is materially integrated in one piece with the guide platform.

5. The arrangement of claim 1, further comprising:
   a base plate on which the force-transmitting device is arranged, the base plate having a recess on which the drive mechanism is arranged.

6. The arrangement of claim 5, wherein:
   an area of the recess has a reduced thickness and an opening for the passage of at least a part of the lifting element.

7. The arrangement of claim 1, wherein:
   the drive mechanism is self-locking, such that the lifting- or guide platform is immobilized in a current position when there is no current flowing to the drive mechanism.

8. The arrangement of claim 1, wherein:
   the actuator further comprises:
   a drive wheel, mounted on the shaft to rotate therewith; and
   a pusher finger, arranged for movement along an elliptical path, such that, while moving on the path, the pusher finger periodically contacts the drive wheel in the sense of a frictional or form-fitting connection.

9. The arrangement of claim 8, wherein:
   the linear displacement of the lifting- or guide platform on the shaft occurs through repeated engagement and release of a frictional contact force between the pusher finger and the drive wheel.

10. An electronic balance, comprising:
    a calibration weight arrangement according to claim 1.

11. The arrangement of claim 1, wherein:
    the actuator further comprises a piezoelectric element; and
    the drive mechanism further comprises a drive wheel which interacts with the piezoelectric element of the actuator, the drive wheel being centrally positioned cooperating with the shaft, which can be set into rotation by the actuator to produce a linear advance movement, the interaction between the piezoelectric element and the drive wheel occurring during the linear advance movement in one direction through the repeated engagement and release of a frictional contact force.

12. The arrangement of claim 11, wherein:
the transfer mechanism further comprises:
   a lifting element;
   a calibration weight seat; and
   a guiding device.

13. The arrangement of claim 12, wherein:
the guiding device comprises:
   two guide posts arranged laterally of the shaft; and
   a guiding brace formed on each side of lifting- or guide platform, sized so that the guide platform can glide along the guide posts almost free of loose play.

14. The arrangement of claim 13, wherein:
the calibration weight seat is materially integrated in one piece with the guide platform.

15. The arrangement of claim 11, further comprising:
a base plate on which the force-transmitting device is arranged, the base plate having a recess on which the drive mechanism is arranged.

16. The arrangement of claim 15, wherein:
an area of the recess has a reduced thickness and an opening for the passage of at least a part of the lifting element.

17. The arrangement of claim 11, wherein:
the drive mechanism is self-locking, such that the lifting- or guide platform is immobilized in a current position when there is no current flowing to the drive mechanism.

18. The arrangement of claim 11, wherein:
the actuator further comprises a pusher finger, arranged for movement along an elliptical path, such that, while moving on the path, the pusher finger periodically contacts the drive wheel in the sense of a frictional or form-fitting connection.

19. The arrangement of claim 18, wherein:
the linear displacement of the lifting- or guide platform on the shaft occurs through the repeated engagement and release of the frictional contact force between the pusher finger and the drive wheel.

20. The arrangement of claim 11, wherein:
the piezoelectric element comprises an integral means for sensing at least one of: the functioning of the transfer mechanism and the actual position of the transfer mechanism.

* * * * *